W. A. JAMES.
SURFACE INDICATOR.
APPLICATION FILED FEB. 12, 1918.
1,279,703.
Patented Sept. 24, 1918.
3 SHEETS—SHEET 1.
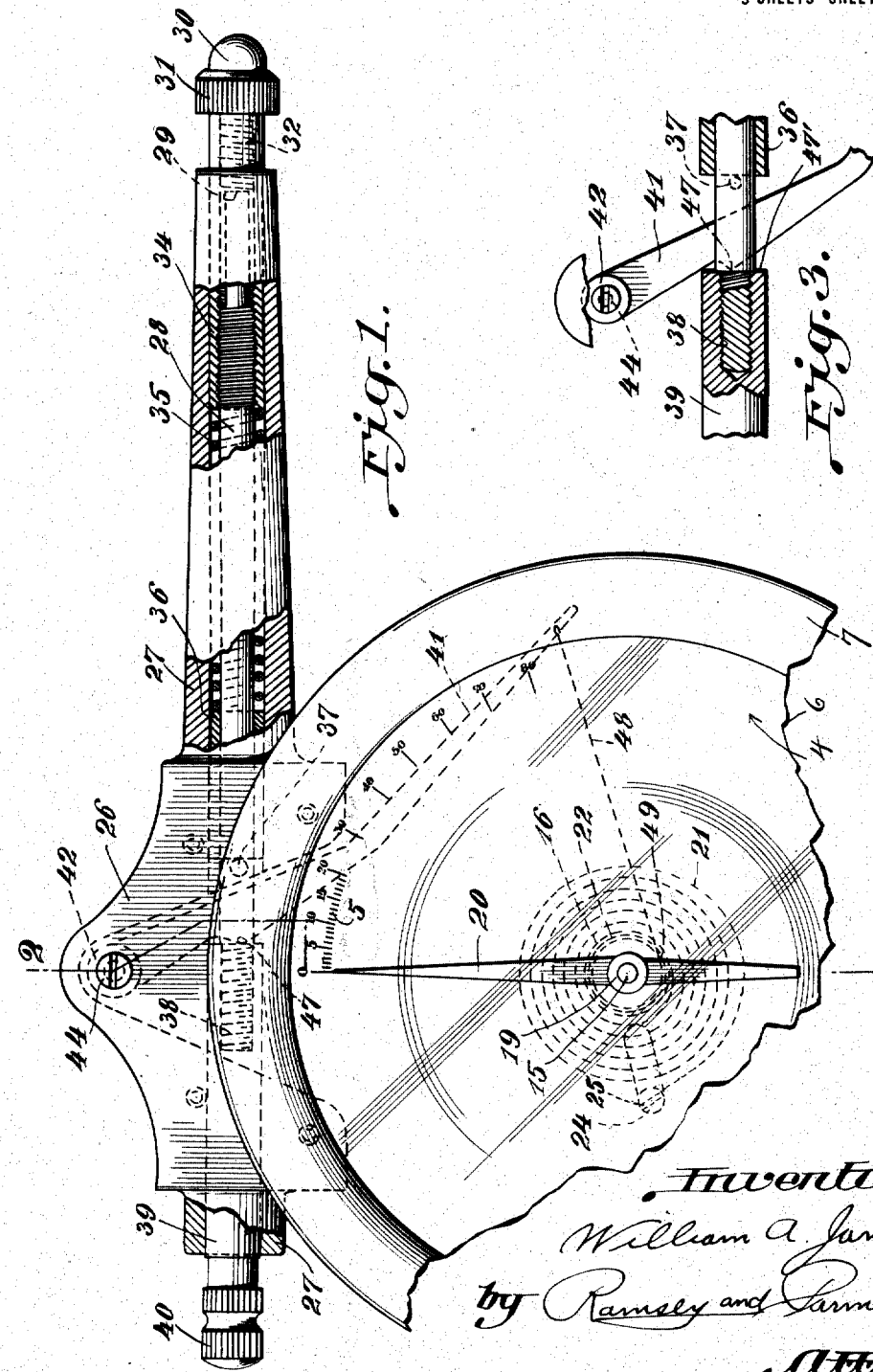
Inventor:
William A. James,
by Ramsey and Parmelee
Attys.

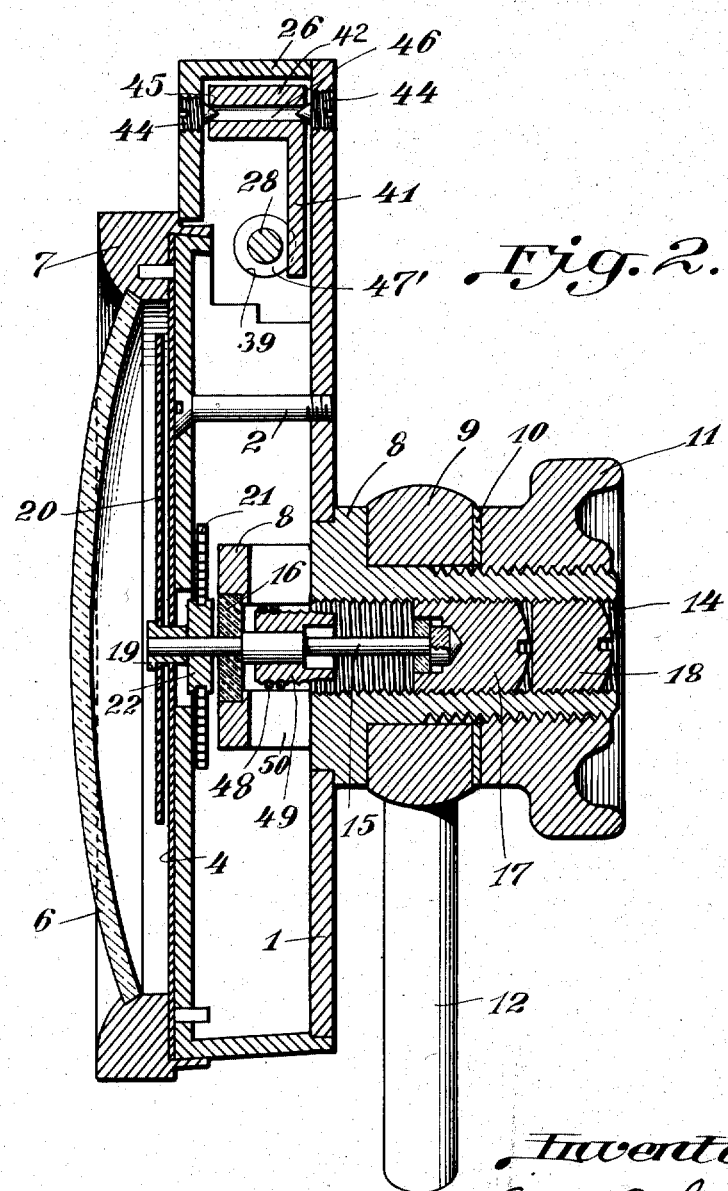

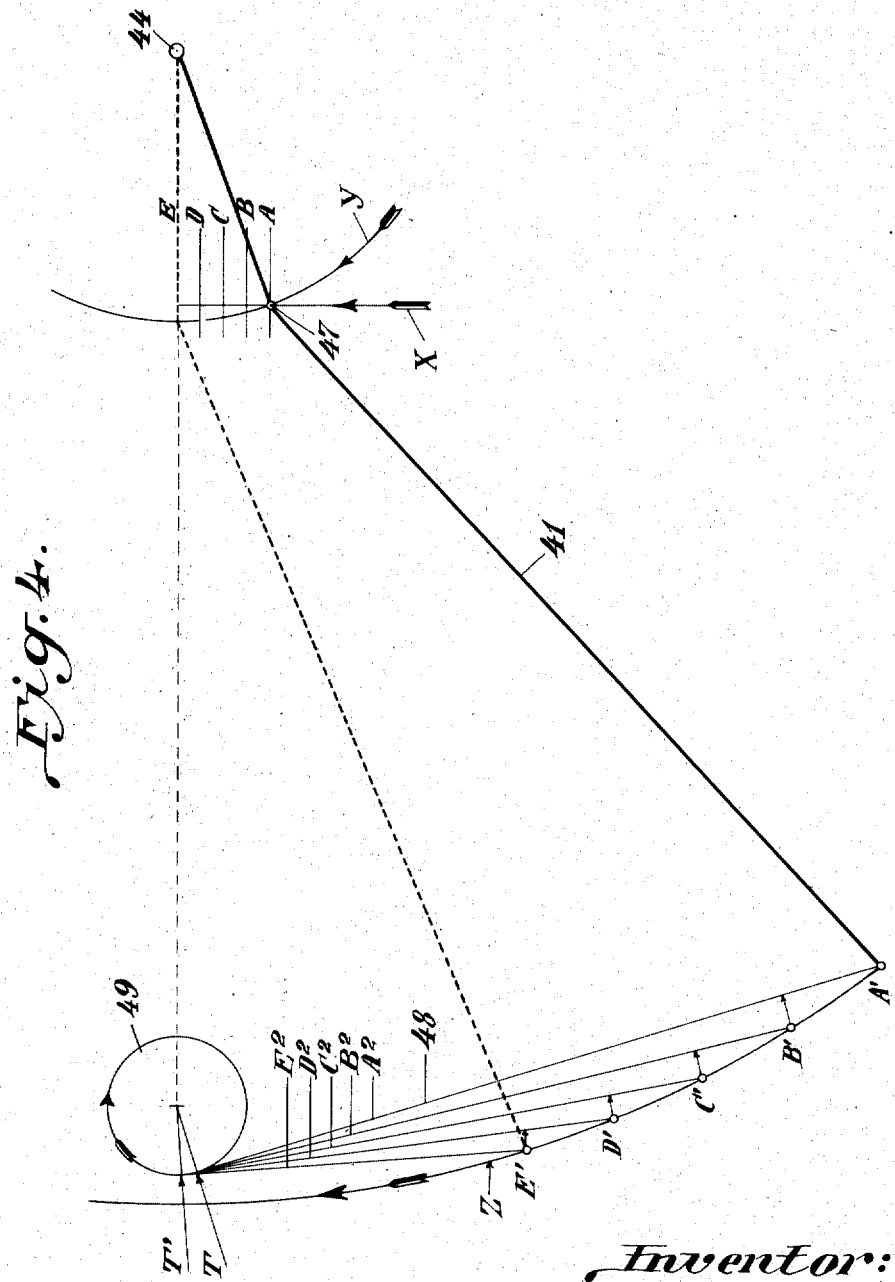

UNITED STATES PATENT OFFICE.

WILLIAM ALFRED JAMES, OF WOONSOCKET, RHODE ISLAND, ASSIGNOR TO THE TAFT-PEIRCE MANUFACTURING COMPANY, OF WOONSOCKET, RHODE ISLAND, A CORPORATION OF RHODE ISLAND.

SURFACE-INDICATOR.

1,279,703.  Specification of Letters Patent.  Patented Sept. 24, 1918.

Application filed February 12, 1918. Serial No. 216,780.

*To all whom it may concern:*

Be it known that I, WILLIAM ALFRED JAMES, a citizen of the United States, residing at Woonsocket, in the county of Providence and State of Rhode Island, have invented certain new and useful Improvements in Surface-Indicators, of which the following is a specification.

This invention relates broadly to precision testing instruments, and more particularly to surface indicating tools.

The principal object of the present invention is an improvement on the type of instrument disclosed in the patent to James, No. 917,444, April 4, 1909.

Another object of the present invention is to provide an instrument of this type having an indicating or dial hand which is at all times under the influence of a plurality of tension devices, so that positive movement thereof in both directions is produced, and with the parts arranged to compensate for changing linear motion into rotary motion.

Another important object of my invention is to provide a knife edge bearing for the measuring arm adapted to coöperate with a surface which may be rotated to bring different portions thereof into engagement with the knife edge so as to compensate for wear thereof, and which may be bodily adjusted to bring the measuring arm to such position that the dial hand is normally at zero.

A further object of the present invention is an indicator of the character specified wherein linear motion is transmitted through lever connections and a flexible cable into rotary motion whereby the parts are arranged to automatically compensate for irregularities due to the action of linear motion on the multiplying lever.

A still further object of the present invention comprises an indicator of the character specified wherein linear movement of the contact member is transmitted as simple harmonic motion to a movement multiplying lever and is further transmitted from said lever through a flexible connection to an indicating hand with the parts arranged to transform the simple harmonic motion into uniform rotation of the said hand.

Other and further objects of the present invention will in part be obvious and will in part be pointed out hereinafter in the specification following by reference to the accompanying drawings wherein like parts are represented by like characters throughout the several figures thereof.

Figure 1 is a plan view illustrating my invention and showing a portion of the outside shell broken away.

Fig. 2 is a sectional view on the line 2—2 of Fig. 1.

Fig. 3 is an enlarged detail of the adjustable bearing for the measuring arm.

Fig. 4 is a diagrammatic view illustrating the arrangement of parts for compensating and coördinating the various movements to produce a proper reading on the indicating scale.

Surface indicators have heretofore been constructed with mulitplying gearing between the indicating hand and the contact point and such constructions have included grooved cams and also trains of toothed gearing. Indicators of this character are objectionable because of the liability of dirt in the gears causing the parts to stick; and also because gearing constructions include more or less lost motion between the indicating hand and the contact point, both of which contribute to inaccuracies of the instrument. It is also old in the art to provide movement multiplying levers connected to the indicating hand by flexible connections, for example the construction disclosed in the James patent No. 917,444, previously referred to. This type of indicator either requires a special graduated scale, or where the hand coöperates with a uniformly graduated scale the indications are relative rather than absolute measurements. In device of this character it is particularly desirable that the moving part be constructed of the lightest mass which will carry sufficient strength to perform the functions desired.

The present invention overcomes the difficulties of the known prior art by providing a construction of few parts of light weight with the parts under tension. A light spring is provided to always tension the indicating hand in the direction of zero, or counter-clockwise; and a heavier spring is provided to always tension the contact arm in the opposite direction or toward the contact point, and whereby the parts are so constructed as to cause the movement of the indicating hand to correspond both in direction and in proportion to the movement of the contact point.

More particularly a preferred embodiment of the present invention comprises a circular casing carrying a suitable scale and an indicating hand which is normally urged toward the zero by a convolute spring. The staff or shaft for the hand is suitably mounted in adjustable jeweled bearings with a small drum on the staff to which is attached a flexible member that is carried around the drum with the other end of the flexible member connected to the outer portion of a lever of the second class that is pivoted in an offset from the circular casing. Extending from the offset portion is a small tube in which a contact member carrying a contact point is mounted in such manner as to be capable of both rotatable and sliding movement. The lever is provided with a knife edge which rests against a hardened surface on a shoulder on this contact member and a coiled spring normally urges the contact member outwardly. The drum on the hand carrying shaft is so positioned within the arc described by the outer end of the multiplying arm that the point of tangency of the flexible member recedes as the arm approaches the drum. To facilitate securing the indicator in position a suitable holder adapted to be clamped by a thumbnut is rotatably mounted on an extension from the back of the casing. This extension where desired may be utilized as a member into which the staff or shaft for the indicating hand may extend thereby providing a relatively long shaft with well spaced apart bearings to carry the indicating hand. The indicator comprising the present invention is positive and accurate in operation and economical to manufacture, as well as being so constructed as to stand considerable abuse without affecting its accuracy.

Referring more particularly to the drawings, my improved indicator preferably comprises a main casing 1 composed of front and back portions connected by means of machine screws 2 or the like. Mounted on the front portion of the casing is a face plate, or dial 4, having suitable graduations 5 formed thereon and protected by a transparent face 6 held in position by a face ring 7 of any well known construction.

Extending through and projecting from the rear portion of the casing is a hub 8 carrying a hub collar 9 held in adjusted position by a washer 10 and hub nut 11. Secured to the adjustable collar 9 is a supporting arm 12 adapted to be clamped in the tool stand of the machine with which the indicator is being employed. By loosening the hub nut 11 the indicator may be adjusted relatively to the support so as to bring the parts thereof into operative relation with the work being tested, as will be more fully described hereinafter. Extending longitudinally through the hub 8 is a central threaded bore 14 adapted to receive the shaft 15 and carrying a sensitive front jewel bearing 16 and an adjustable rear jewel bearing 17. The rear jewel bearing may be held in adjusted position and protected from breakage by means of a jewel bearing check screw 18 threaded into the bore of the hub.

The indicating mechanism may comprise a dial hand bushing 19 carried by the front of the shaft 15 for supporting the dial hand 20. A hair spring 21 secured at one end to the collet 22 fixedly mounted on the shaft 15, and at the other end mounted in an anchor post 24 by means of a wedge 25, tends normally to urge the hand 20 to rotation toward the zero position or counter clockwise. At the side of the casing 1 is a supplemental casing 26, having an outwardly projecting extension 27 constituting a container and bearing for the plunger rod 28 of the contact member and its associated parts. The projecting end 29 of the plunger rod carries a contact head 30 having a knurled portion 31 for positioning the threaded portion 32 within the sliding sleeve 34 so that the end of the threaded portion contacts with the end of the rod 28 and acts to lock the sleeve 34 in position on the rod 28. A comparatively strong coiled spring 35 surrounds the central portion of the plunger rod and abuts at one end against the fixed sleeve 36, and at the other end engages the sliding sleeve or bushing 34 for normally urging the same outwardly to the limit permitted by the plunger rod bushing stop pin 37. The inner end 38 of the plunger rod is in adjustable threaded engagement with the extension rod 39 having a knurled operating head 40.

A measuring arm, or movement multiplying device 41, having a cylindrical journal portion 42 supported by the conical bearing surfaces 45 of the adjustable pivots 44 extending into the hollow bore 46, is provided with a knife edge 47 in direct operative engagement with the surfaced end 47' of the extension 39. The opposite end of the measuring arm 41 is adapted to actuate the indicating hand by means of a flexible member 48 secured to, and passing around, the drum 49 on the indicating hand shaft 15. Openings 50 in the hub 8 permit the passage of the flexible connection in the manner described. As before pointed out, the hair spring 21 is adapted to urge the indicating hand to rotation in counter clockwise direction, away from normal zero position while the flexible member 48 passes around the drum 49 so as to act in opposition to the rotational tendency of the hair spring.

As previously stated the motion from the contact point is transmitted to the measuring arm or lever as simple harmonic motion. Such motion, as is well known, is not uniform and as it is desirable that the movement of the indicating hand be uniform, provision is made for compensating for this effect.

Referring now more particularly to Fig. 4 for a preferred form of my device, the plunger rod travels in the direction indicated by the arrow X. Since the lever arm is pivoted, as at 44, the knife edge 47 must travel in the arc of the circle Y and the point where the flexible member 48 is secured to the arm 41 describes the circle Z, while the flexible member 48 is at all times a straight line that is tangent to the drum 49. Assuming the limits of movement of the knife edge 47 to be represented by equal spaces A, B, C, D, and E, then as the plunger rod travels through these distances the point of connection between the spring and the measuring arm will travel through the positions A', B', C', D', and E'; while the flexible member 48 will occupy the positions A², B², C², D², and E². When the outer end of the lever 41 is at A' the flexible member 48 will be tangent to the drum 49 at T, and when the lever 41 has moved to the position E' then the member 48 will be tangent at the position T'. The drum 49 is so located relatively to the arc Z that the variable motion between the position A' and E' of the end of the arm 41, due to simple harmonic motion, is compensated in such manner that the rotation of the drum is substantially uniform within the limits of movement of the device. I am aware that this compensation may be accomplished by other constructions, such as a drum of variable radius. I have herewith shown what I believe to be the preferred construction.

From the foregoing it is believed that the operation of my improved indicator will be obvious. After the hub arm 12 is properly positioned in the tool post of the machine with which the device is being used so as to bring the contact member 30 into engagement with the surface being tested, the machine is operated to produce a relative movement between the surface and the contact member. Irregularities on the surface will tend to produce a longitudinal movement of the plunger rod 28 in opposition to the coiled spring 35, which movement is transmitted to the measuring arm 41 through the knife edge contact in direct engagement with the plunger rod. The effectiveness of the coiled spring 35 being overcome, the hair spring becomes in turn effective to produce a rotational movement of the indicating hand 20 which is transmitted to the measuring arm 41 through the flexible connection. As soon as the irregularity is passed, the coiled spring 35 again operates against the action of the hair spring and restores the indicating hand to normal position, its operation being the reverse to that just described, the measuring arm now pulling in opposition to the hair spring. Due to the employment of the two springs, it will be apparent that a tensional relation is always maintained between the indicating hand and the contact member so that there is no lost motion interfering with accuracy of operation of the indicating hand.

In order that any wear between the knife edge and the surfaced end 47' of the extension 39 may be compensated, the entire plunger rod is rotatable to bring different portions of the bearing surface into contact with the knife edge. Rotation of the plunger rod as a unit may be produced through the knurled operating portions on the opposite ends thereof, or relative movement between the parts may be secured in like manner. This adjustment constitutes a valuable feature of the present invention inasmuch as it provides means for always maintaining the indicating hand in proper normal zero position.

Realizing that this invention may be embodied in structures other than the specific construction herein disclosed, it is desired that this disclosure be understood as illustrative and not in the limiting sense.

Having thus described my invention what I claim is:—

1. A surface indicator comprising a casing, a reciprocating contact member projecting therefrom, a dial carried by the casing, an indicator rotatably mounted in the casing and coöperating with a scale on the dial, a measuring arm directly coöperating with said contact member, a flexible connection between said measuring arm and the indicator, a spring connected with said indicator and urging the same to rotation, means for adjusting the indicator to the zero of the scale without changing the position of the contact and of the contact members, and a spring engaging said contact member and urging the same to outward movement, whereby the parts are maintained in tensional relation.

2. A surface indicator comprising a casing, a reciprocating contact member projecting therefrom, a dial carried by the casing, an indicator rotatably mounted in the casing and coöperating with a scale on the dial, a measuring arm having a knife edge directly coöperating with said contact member, a flexible connection between said measuring arm and the indicator, a spring connected with said indicator and urging the same to rotation, and a spring engaging said contact member and urging the same to outward movement whereby the parts are maintained in tensional relation.

3. A surface indicator comprising a casing, a rotatably adjustable reciprocating contact member projecting therefrom, a scale carried by the casing, an indicator rotatably mounted in the casing and cooperating with said scale, a measuring arm directly coöperating with said adjustable contact member, a flexible connection between said measuring arm and the indicator, a spring connected with said indicator and urging the same to rotation, and a spring engaging said contact member and urging the same to outward movement whereby the parts are maintained in tensional relation.

4. A surface indicator comprising a casing, a rotatably and longitudinally adjustable reciprocating contact member projecting therefrom, a scale carried by the casing, an indicator rotatably mounted in the casing and coöperating with said scale, a measuring arm directly coöperating with said adjustable contact member, a flexible connection between said measuring arm and the indicator, a spring connected with said indicator and urging the same to rotation, and a spring engaging said contact member and urging the same to outward movement whereby the parts are maintained in tensional relation.

5. A surface indicator comprising a casing, a support on said casing, a reciprocating contact member projecting therefrom, a dial carried by said casing, an indicator rotatably mounted in the casing and coöperating with a scale on said dial, a measuring arm directly coöperating with said contact member, a flexible connection between said measuring arm and the indicator, a spring connected with said indicator and urging the same to rotation, means to adjust the indicator to the zero of the scale without changing the position of the contact end of the contact member, and a spring engaging said contact member and urging the same to outward movement whereby the parts are maintained in tensional relation.

6. A surface indicator comprising in combination a casing, a reciprocating contact member having an end projecting from said casing, a dial carried by said casing, an indicator rotatably mounted in said casing and adapted to indicate readings on a scale on the dial, a measuring arm in direct engagement with said contact member, means operatively connecting said measuring arm with said indicator, a spring connected with said indicator and urging same to rotate in a direction to produce a positive reading from zero position on the scale, a spring coöperating with said contact member and tending to force said contact member outwardly and thereby tending to move said indicator in a direction to produce a negative reading relative to the scale whereby the connecting means are maintained by tension, and means for adjusting the indicator to normally stand at the zero of the scale and without changing the position of the contact end of the contact member.

7. As an article of manufacture, a contact member for surface indicators comprising a plunger rod, an extension adjustably secured thereto, a bearing surface formed on said extension, and means for rotatably and longitudinally adjusting said bearing surface.

8. A device of the character described, in combination, a relatively thin casing, a hub extending from said casing, said hub being constructed hollow, a shaft extending into said hub, bearings for said shaft supported by said hub, an indicating hand upon said shaft, and means for rotating said shaft to operate said indicating hand.

9. In a device of the character described, in combination, a relatively thin casing, a hub projecting from the middle portion of said casing, a supporting rod provided with a sleeve through which said hub extends, a clamp nut for clamping said hub to said sleeve, said hub being formed hollow, a shaft extending into said hub, bearings for said shaft, an indicating needle carried by said shaft, and means for operating said indicating needle.

10. In a device of the character described, in combination, a casing, a hub extending outwardly from said casing, and being provided with an opening, a support coöperative with said hub to permit said casing to be adjusted relatively to said support, a shaft extending into an opening in said hub, bearings for said shaft carried by said hub, and means for rotating said shaft, substantially as described.

11. A device of the character described, comprising in combination, a casing, a sleeve extending from said casing, a contact post slidable and rotatable in said sleeve, a shoulder on said post and being provided with a hardened surface, a lever having a knife edged bearing constructed to rest against said hardened surface, a flexible connection secured to one end of said lever, a drum to which the other end of said flexible connection is secured, a shaft, and a convolute spring normally tending to rotate said shaft to cause said drum to draw the knife edge on said lever against said surface.

12. In a device of the character described, a lever, a contact post operatively connected with said lever whereby the linear motion of said post produces simple harmonic motion of said lever, a shaft, a drum mounted on said shaft, and means operatively connecting said drum and said lever, the parts being constructed and arranged in such manner that the simple harmonic motion of said lever is transmitted as uniform rotative motion to said drum.

13. In a device of the character described, the combination of a casing, a lever pivotally mounted in said casing, a contact post rotatably and slidably mounted relatively to said casing, a shaft, a drum on said shaft, a flexible connection between said drum and said lever; the said drum being so positioned that the movement of said lever toward said drum causes the point of tangency of the flexible member relative to said drum to move forward in the direction of rotation of the drum.

WILLIAM ALFRED JAMES.

Copies of this patent may be obtained for five cents each, by addressing the "Commissioner of Patents, Washington, D. C."